United States Patent
Profitt

(10) Patent No.: US 6,932,376 B1
(45) Date of Patent: Aug. 23, 2005

(54) HITCH TONGUE INTEGRATED SAFETY FASTENER FOR BALL AND SOCKET HITCH

(76) Inventor: Ronald E. Profitt, 100 Hathaway La., Kalispell, MT (US) 59901

(*) Notice: Subject to any disclaimer, the term of this patent is extended or adjusted under 35 U.S.C. 154(b) by 0 days.

(21) Appl. No.: 10/962,024

(22) Filed: Oct. 8, 2004

(51) Int. Cl.⁷ .............................................. B60D 1/28
(52) U.S. Cl. ..................................... 280/507; 280/432
(58) Field of Search ...................... 280/507, 511, 432

(56) References Cited

U.S. PATENT DOCUMENTS

| | | | | |
|---|---|---|---|---|
| 4,032,171 A | * | 6/1977 | Allen et al. ................. | 280/507 |
| 4,836,570 A | * | 6/1989 | Lopez et al. ................ | 280/507 |
| 5,087,064 A | * | 2/1992 | Guhlin ........................ | 280/507 |
| 5,832,021 A | * | 11/1998 | Kondo ........................ | 375/150 |
| 6,155,589 A | * | 12/2000 | Simpson .................... | 280/507 |
| 6,666,051 B1 | * | 12/2003 | Li ................................ | 70/14 |
| 6,722,686 B2 | * | 4/2004 | Koy ............................ | 280/507 |
| 6,802,523 B1 | * | 10/2004 | Profitt ........................ | 280/507 |

* cited by examiner

Primary Examiner—Tony Winner
(74) Attorney, Agent, or Firm—Keith S. Bergman

(57) ABSTRACT

A safety fastener for ball and socket hitches provides two laterally spaced vertical fastening collars structurally carried on each side of a vehicle hitch tongue forwardly of the hitch ball and defining a plurality of vertically spaced fastening pin holes extending diametrically therethrough. Each vertical fastening collar carries a vertical fastening post at least one of which defines a plurality of vertically spaced fastening pin slots therein for adjustable positioning in at least one fastening collar by a fastening pin in releasably extending therebetween. The fastening posts carry a horizontal beam extending therebetween, the horizontal beam having a rearwardly extending fastening protuberance over the socket beam carried on the ball. Fastening pins may be lockable to prevent unauthorized disconnection of the socket beam from the ball.

3 Claims, 3 Drawing Sheets

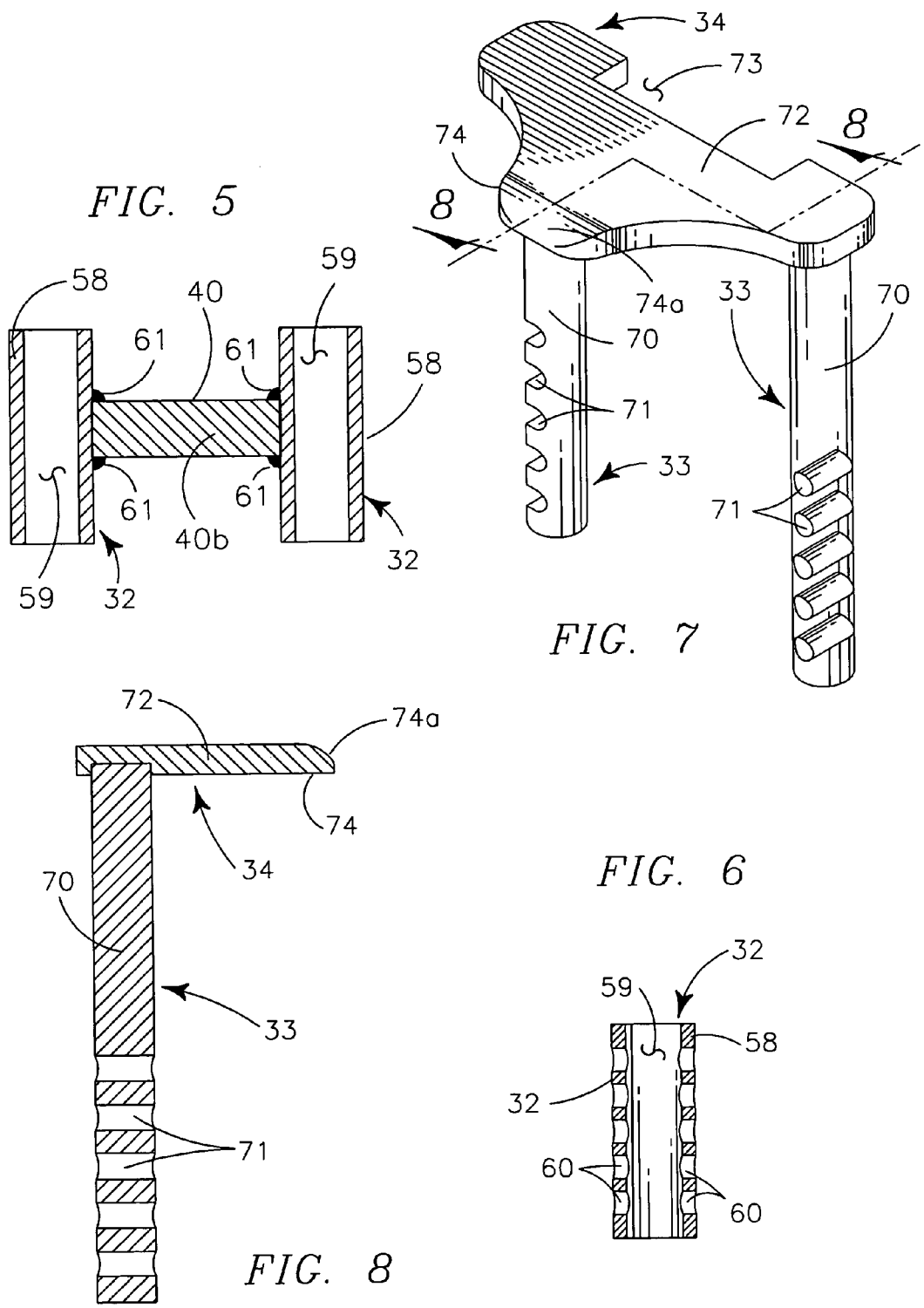

HITCH TONGUE INTEGRATED SAFETY FASTENER FOR BALL AND SOCKET HITCH

RELATED APPLICATIONS

There are no applications directly related hereto heretofore filed in this or in any foreign country.

BACKGROUND OF INVENTION

1. Field of Invention

My invention relates generally to land vehicles and more particularly to a safety fastener for ball and socket hitches that is structurally integrated with the hitch tongue to prevent a hitch socket from moving upwardly from a ball carrying it.

2. Background and Description of Prior Art

When first powered towing vehicle pulls a second towed vehicle, especially such as a non-powered trailer, for effective operation a hitch interconnecting the vehicles must allow motion of each vehicle relative to the other in three mutually perpendicular planes while yet providing an interconnection of appropriate strength, security and safety. A common and popular hitch that accomplishes these ends is the "ball and socket" hitch, which normally provides a spherical ball carried by a depending bolt for fastening on a rigid hitch bar carried by the towing vehicle and a hitch carried by the towed vehicle that defines a hemispherical chamber to pivotally receive the spherical ball. The hitch provides a fastening arm that communicates with the surface of the associated ball that is not covered by the hemispherical chamber of the hitch to releasably fasten the hitch on the ball and prevent it from being accidentally dislodged.

This type of ball and socket hitch is well known, simple of use, readily available and widely used, especially with trailers of lower and medial gross weight. This ball and socket hitch notwithstanding its popularity is not completely reliable or safe in use however as often forces encountered in normal towing usage may disengage the socket from the ball by disabling the internal fastening structure by either permanent or temporary forced reconfiguration. This problem has been recognized and dealt with in the past, commonly by providing a secondary safety connection such as a chain interconnecting the towing and towed vehicles. This solution though operative is not completely satisfactory as the interconnection of the two vehicles by flexible chain does not provide the same positional constraints for the vehicles relative to each other that is provided by the ball and socket hitch when interconnected and makes continued pulling by only the chain interconnection quite erratic and dangerous.

This problem has been recognized and responsively various other auxiliary safety devices have become known to operatively maintain the hitch socket on the associated ball. These known safety devices have generally been designed for and are only effectively operable with hitches for lighter towed vehicles. In the modern day, however, the trend in both towing vehicles and towed vehicles has been toward heavier vehicles and a need has arisen to provide a safety fastener for use with heavier vehicles that still allows use of the traditional ball and socket type hitch. The instant safety fastener seeks to fulfill this need.

Prior safety fasteners for lighter ball and socket hitches have not provided nor been required to provide completely structurally secure fastening of the safety fastener on the vehicle hitch bar while yet allowing three dimensional motion of a hitch relative to the ball supporting it. One method for providing such structurally secure fastening of a safety fastener has been to provide a safety fastener with a body defining a channel that completely surrounds the hitch beam of a towing vehicle that is to carry it with the bolt of the hitch ball extending through the body and hitch beam carried in the body channel to rigidly secure the elements, such as disclosed in the instant inventor's pending Utility patent application Ser. No. 10/696,315, filed Oct. 29, 2003. The body of that safety fastener provides the advantage of removal and replacement, but at the expense of a more massive, complex and expensive structure. The instant safety hitch provides similar safety structure but with no body and laterally spaced vertical fastening post collars to receive vertical fastening posts to support the horizontal fastening beam integrally carried directly by the hitch beam of the towing vehicle. This structure provides a safety fastener of less mass and cost that offers as great or greater strength but at the expense of removability. Experience has demonstrated that removability is not an essential requirement for a safety hitch and in many instances it is overshadowed by lower cost and the ability to acquire a safety hitch as an integral part of original equipment rather than a retro-fittable accessory.

Safety hitches that provide some fastening element above the socket of a ball and socket hitch to maintain interconnection of the socket on the ball have generally supported the fastening element in a cantilevered fashion, probably largely to prevent interference with motion of the socket on the ball while yet allowing relatively free pivotal motion of the elements relative to each other in three mutually perpendicular planes. The instant safety device provides two spacedly adjacent vertical fastening posts carried in vertical fastening post collars integrally supported by the hitch tongue for adjustable vertical motion with a horizontal fastening beam extending between the upper end portions of the vertical posts to provide a beam type member to restrain upward motion of the socket member in a substantially non-cantilevered fashion and to provide substantial strength and rigidity in excess of that provided by cantilevered type fastening members.

Prior safety fasteners that have provided a fastening element above the socket of a ball and socket hitch have generally been supported on the a hitch beam or hitch tongue by of some type of releasable mechanical interconnection because they generally have been designed as a retro-fittable accessory and this type of fastening probably is easier for a user to install. This construction generally has not provided the strength and structural rigidity as is provided by fastening structures having integral support directly on the hitch tongue. The instant safety fastener provides a base element having only two vertically oriented collars that are structurally carried by the opposed sides of the hitch tongue spacedly forwardly of the ball supported thereby. These collars are integrally joined to the hitch tongue by welding to allow the safety fastener to be used as a part of the originally manufactured product and also alternatively as a retro-fittable accessory, while yet providing the strength and rigidity of an integrally formed article of manufacture in either instance.

Though most ball and socket hitches for automotive vehicles have developed somewhat of a standardized configuration, there are some configurational variances between the hitches of various manufacturers. To accommodate such differences and allow use of the instant safety fastener on a substantial number of present day ball and socket hitches, it is necessary to make provision for adjustable vertical positioning of the horizontal fastening beam of the safety fastener relative to its support post collars. The instant safety fastener accommodates this requirement by providing to support post collars that allow sliding motion of support posts within their channels for adjustable vertical positioning. A plurality of similarly vertically spaced holes are defined in at least one of the collars and the support post carried therein to allow a fastening pin to extend through a cooperating set of such opposed holes to releasably maintain adjustable vertical positioning of the at least one vertical support arm relative to the collar carrying it.

With this pin type adjustment structure the fastening pin may be of a headed type with a lock structure at the end distal from the head to allow locking of the fastening pin in a cooperating set of adjustment holes to prevent unintentional removal of the socket element of a hitch from the associated ball and thusly prevent removal of a towed vehicle from a towing vehicle. Various prior safety fasteners have provided some means for adjusting the vertical position of a fastening arm relative to the hitch being fastened, but in general such prior fasteners have not used a pin and spaced hole type adjusting system with a key type lock to prevent unauthorized removal of the ball and socket hitch elements from each other.

My invention resides not in any one of these features individually but rather in the synergistic combination of all of its structures which necessarily give rise to the functions flowing therefrom as hereinafter further specified.

SUMMARY OF INVENTION

The instant safety fastener for ball and socket hitches provides two similar laterally spaced vertical fastening post collars structurally carried on opposed lateral sides of the hitch tongue of a vehicle hitch structure. At least one vertical post collar defines a set of diametrically extending vertically fastening spaced pin holes extending therethrough. Each vertical post collar slidably carries a vertically oriented fastening post for slidable vertical motion therein. At least one vertical post carried by the at least one collar defining fastening pin holes defines a set of fastening pin holes vertically spaced to receive a fastening pin extending through the collar and associated vertical post for vertically adjustable fastening of the post in the collar. The vertical fastening posts structurally carry a horizontal fastening beam extending between their upper portions for positioning over the hitch portion carried by a supporting ball to prevent removal of the hitch from the ball. The fastening pins carry fastening structure to prevent accidental removal and the fastening structure optionally may be of a lock type to prevent unauthorized removal of the socket element from the ball carrying it.

In creating such a device it is:

A principal object to provide a safety fastener for ball and socket type hitches interconnecting vehicles of medial to heavy gross weights that is of a safe, efficient and strong nature.

A further object is to provide such a safety fastener that has adjustable features to allow use with various ball and socket hitches of present day commerce without reconfiguration of the safety fastener, the ball and socket hitch or the vehicular hitch or its tongue beams.

A further object is to provide such a safety fastener that has two vertical post collars carried on the opposed lateral sides of a hitch tongue to allow installation of the safety fastener as an integral part of a vehicle hitch structure during original manufacture or to allow installation as a retrofitted accessory.

A still further object is to provide such a safety fastener wherein the vertical post collars slidably carry vertical posts for adjustable vertical positioning and the vertical posts carry a horizontal fastening beam extending between their upper end portions to extend over an associated socket to prevent vertical motion of the socket relative to the ball supporting it.

A still further object is to provide such a safety fastener wherein the vertical position of vertical fastening posts relative to the vertical post collars is determined by pins extending through mating sets of vertically spaced holes defined in the post collars and fastening posts.

A still further object is to provide such a safety fastener that optionally may have fastening pins with locking elements to prevent accidental or unauthorized removal of the socket element from the supporting ball.

A still further object is to provide such a safety fastener that is of new and novel design, of a rugged and durable nature, of simple and economic manufacture and one that is otherwise well-suited to the uses and purposes for which it is intended.

Other and further objects of my invention will appear from the following specification and drawings which form a part hereof. In carrying out the objects of the invention, however, it is to be understood that its essential features are susceptible of change in design and structural arrangement with only one preferred and practical embodiment of the best known mode being illustrated and specified as is required.

BRIEF DESCRIPTIONS OF DRAWINGS

In the accompanying drawings which form a part hereof and wherein like numbers of reference refer to similar parts throughout:

FIG. 5 is a transverse vertical cross-sectional view through the vertical fastening post collars of FIG. 4, taken on the line 5—5 thereon in the direction indicated by the arrow.

FIG. 6 is an elongate vertical cross-sectional view through the right vertical fastening post collar of FIG. 4, taken on the line 6—6 thereon in the direction indicated by the arrows.

FIG. 7 is an isometric view of the vertical fastening posts and fastening beam carried thereby isolated from the safety fastener of FIG. 3.

FIG. 8 is a vertical cross-sectional view of the fastening beam of FIG. 7, taken on the broken cross-section line 8—8 thereon in the direction indicated by the arrow.

DESCRIPTION OF PREFERRED EMBODIMENT

Figures 1, 2, 9:
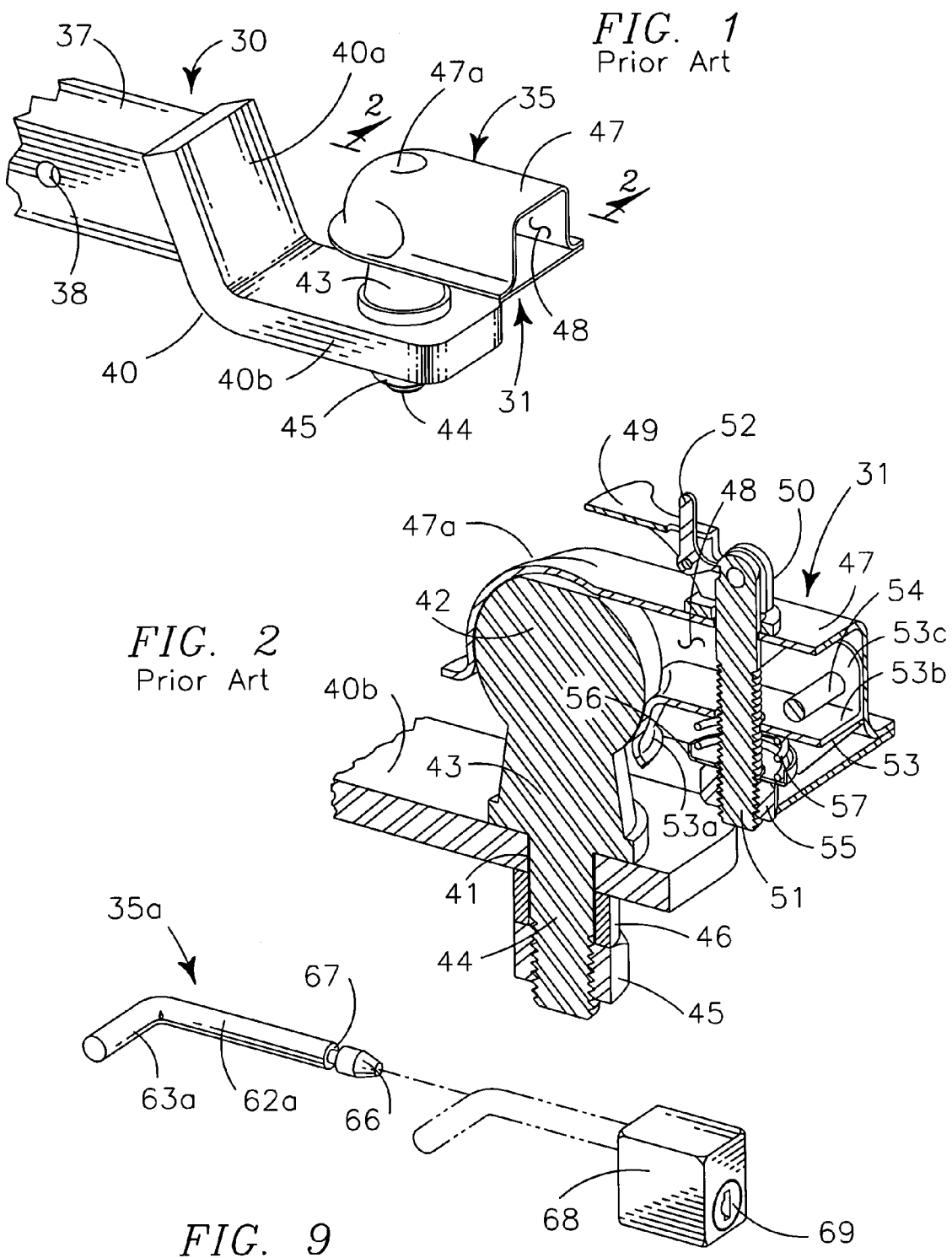
FIG. 1 is an isometric view of the rear portion of a typical hitch structure carrying a generic ball and socket hitch with which my safety fastener may be used.
FIG. 2 is a partially cut-away and enlarged detailed isometric view of a typical socket in operative position on a supporting ball such as would be seen if taken on the line 2—2 on FIG. 1 in the direction indicated by the arrows thereon.
FIG. 9 is an expanded isometric view of a lockable pin structure that may be used to positional maintain a vertical fastening post in a vertical fastening post collar.
Figure 3:
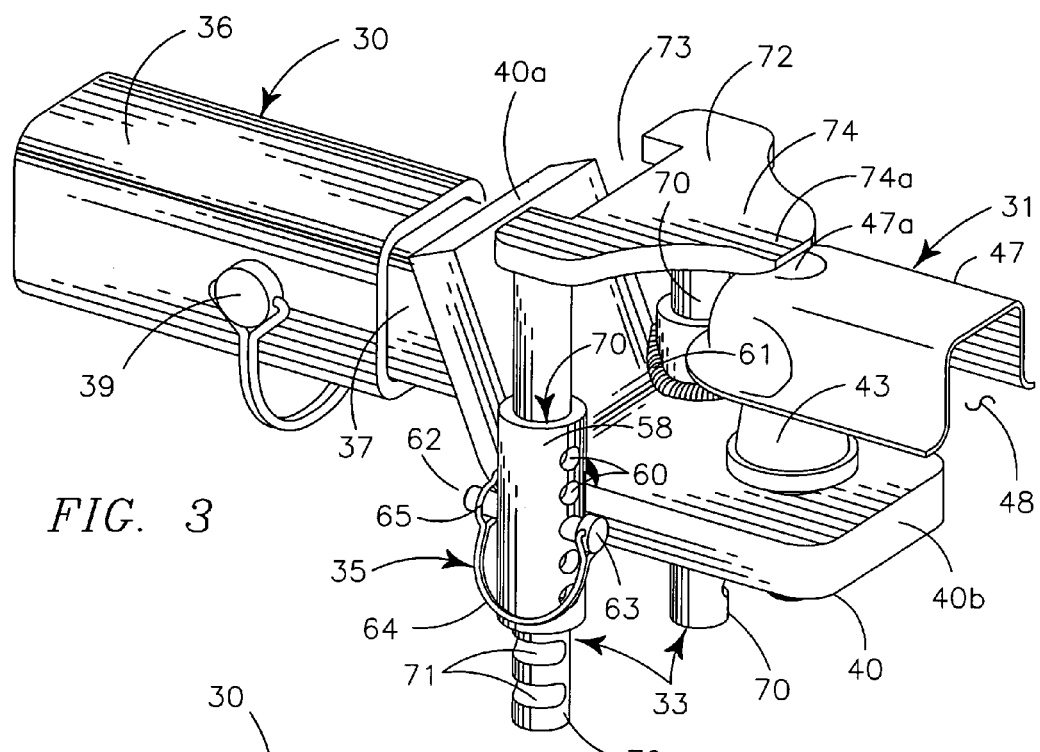
FIG. 3 is a forward looking isometric view of the instant safety fastener in operative position on the ball and socket hitch such as that of FIGS. 1 and 2.

A typical vehicle hitch structure 30 with a common ball and socket hitch 31 with which my safety fastener is operative as illustrated in FIGS. 1–3. The frame of a towing vehicle (not shown) supports a rearwardly extending square box beam 36 configured to slidably carry square hitch beam 37 in its internal channel. The beams 36,37 each define cooperating pairs of fastening holes 38 extending horizontally through the vertical opposed sides of each beam 36,37 to receive pin type fastener 39 therethrough to releasably interconnect hitch beam 37 within the channel of box beam 36. The rearward end portion of hitch beam 37 structurally carries hitch tongue 40 having forward angulated portion 40a and rearward horizontal portion 40b. The medial portion of hitch tongue portion 40b defines ball fastening hole 41 extending therethrough to receive the fastening bolt of a ball member of the ball and socket hitch 31. This type of square beam 37 allows 180° repositioning in the channel of square box beam 36 so that the rearward horizontal portion 40b of the hitch tongue 40 may be selectively positioned at a higher or lower position relative to box beam 36.

The ball member of ball and socket hitch 31 provides a spherical ball 42 supported on base 43 so that more than half of the spherical surface of ball 42 is exposed. Fastening bolt 44 depends from base 43 to define a lower threaded portion which carries nut 45. For use, fastening bolt 44 is inserted through fastening hole 41 defined in hitch tongue 40 as illustrated in FIG. 2, and nut 45 is placed thereon to fasten the ball member 42 on the hitch tongue 40, commonly with one or more cylindrical washers 46 extending between the upper surface of nut 45 and lower surface of hitch tongue 40 to allow accommodation of hitch tongues of different thicknesses.

The socket member of ball and socket hitch 31 provides socket beam 47 of "U" shaped cross-section having spherical forward end portion 47a to fit upon upper portions of the spherical surface of ball 42. The "U" shaped socket beam 47 extends spacedly rearwardly from the ball 42 for interconnection with the tongue of a trailer or other towed vehicles (not shown).

Medial channel 48 defined by "U" shaped socket beam 47 carries fastening structure to releasably maintain the socket beam 47 in pivotally movable interconnection with spherical ball 42. This fastening structure commonly provides over center lever 49 carried for pivotal and vertical motion by bracket 50. The over center lever 49 pivotally carries depending fastener link 51 and release lever 52 which may be pivoted into and out of connection with fastener link 51. Fastening arm 53 defines depending forward portion 53a configured to communicate with the rearward surface of spherical ball 42 and horizontal arm 53b extending spacedly rearwardly beyond fastener link 51 which is carried in a hole defined in horizontal arm 53b to allow the fastener links to extend therebeneath. Mounting bracket 53c extends upwardly from horizontal arm 53b of the fastening arm 53 to receive pin 54 which pivotally mounts the fastening arm 53 within medial channel 48 of "U" shaped socket beam 47. The lower portion of fastener link 51 is threaded to receive nut 55 supporting cup type washer 56 on its upper surface which in turn supports cylindrical compression spring 57 between the upper surface of washer 56 and the lower surface of horizontal arm 53b forward of pin 54 to bias the depending forward portion 53a of fastening arm 53 upwardly.

With this mechanism when over center lever 49 is in the forwardly extending horizontal down position as illustrated in FIG. 2, fastening arm 53 will be in the upward position illustrated in FIG. 2 with depending forward portion 53a immediately adjacent the lower rearward portion of ball 42 to fasten the socket member on the ball member. When release lever 52 is pivoted rearwardly the biasing force in compression spring 57 will be released and fastening arm 53 may move downwardly to release depending forward portion 53a from its fastening position adjacent ball 42 and responsively allow removal of socket beam 47 from ball 42.

Though the foregoing illustrated and described generic fastening mechanism is common to various presently commercially available ball and socket hitches, the description of this particular fastening mechanism is not intended to be limiting, but rather is intended only to describe background to show the use environment of my safety fastener. The use of my safety fastener on other compatible ball and socket type hitches having other fastening mechanisms is within the spirit, essence and scope of the instant invention.

My safety fastener as seen in FIG. 3 provides paired opposed vertical fastening post collars 32 adjustably carrying vertical fastening posts 33, positionally maintained in vertical fastening post collars 32 by fastening pins 35 and carrying horizontal fastening beam 34 in the upper end portions of the vertical fastening posts 33.

Figure 4:
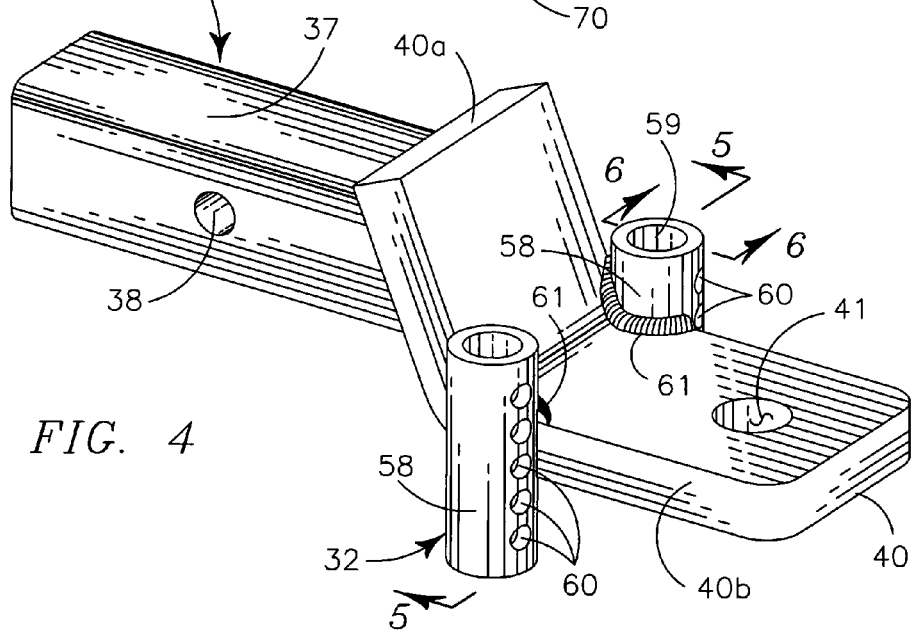
FIG. 4 is an isometric view similar to that of FIG. 3 showing only the hitch beam and interconnected hitch tongue carrying the vertical fastening post collars of the instant safety fastener.

Vertical fastening post collars 32 are tubular elements formed by circularly cylindrical bodies 58 defining medial channels 59 as seen in FIGS. 3–5. Each cylindrical body 58 defines a plurality of vertically spaced diametrically opposed fastening pin holes 60. Each cylindrical body 58 is structurally carried in its axially medial portion on the forward portions of the opposed lateral sides of hitch tongue portion 40b, spacedly forward of ball fastening hole 41. This structural interconnection is accomplished by welds 61 structurally joining the adjacent surfaces of the cylindrical bodies 58 and hitch tongue 40. The welding operation may be accomplished as part of the original manufacturing process of the vehicle hitch structure or as a subsequent retro-fitable process after manufacture of the vehicle hitch structure.

Each vertical fastening post collar 32 carries fastening pin 35 extending through a cooperating pair of fastening pin holes 60. In the instance illustrated in FIG. 3, fastening pin 35 provides cylindrical body 62 with head 63 at a first end and arcuate resiliently deformable fastener 64 extending from pivotal interconnection with head 63 and defining looped end portion 65 fastenable over the second end of pin body 62 for maintenance of the fastening pin 35 within fastening pin hole 60 carrying it.

The fastening pin may also be of the lockable type 35a illustrated in FIG. 8. This lockable fastening pin 35a is an "L" shaped pin having longer cylindrical body 62a with substantially perpendicularly extending fastening head 63a at a first end. The diameter of the body 62a is such as to slidably fit within fastening pin holes 60 of vertical fastening post collars 32 and then cooperating fastening pin channels defined in vertical fastening posts 33. The second outer end portion of body 62a defines truncated conic point 66 with annular fastening groove 67 defined spacedly axially inward from the truncated conic point 66. The second fastening end portions 66,67 of fastening pin 35a is configured to be received in lock box 68. The axial length of body 62a is somewhat greater than the diameter of the vertical fastening post collar 32 in which it is to be carried to allow the fastening pin 35a to be fastened therein with lock box 68 on one side of the vertical fastening post collar 32 and fastening head 63 on the other side of that collar 32. The lock box 68 illustrated is one having a cylindrical key operated lock with a locking lug (not shown) adapted to fit within annular groove 67. Both this type of locking pin 35a and the spring type locking pin 35 are known, commercially available in the present day marketplace and therefore not described in detail.

Vertical fastening posts 33 as seen in FIGS. 3, 7 and 8 are similar elongate circularly cylindrical rods 70 of a diametrical size to slidably fit within medial channels 59 of vertical fastening post collars 32. The lower portions of each cylindrical rod 70 defines a plurality of axially spaced holes or slots 71 to receive the cylindrical body 62 of fastening pin 35 therein and allow that fastening pin 35 to pass through a set of the paired opposed fastening pin holes 60 defined in vertical fastening post collars 32 to positionally maintain the vertical fastening posts 33 in a selected vertical position in the vertical fastening post collars 32.

Horizontal fastening beam 34 provides planar body 72 extending between and structurally carried by the upper end portions of vertical fastening posts 33. The planar body 72 is somewhat elongate with a major dimension extending laterally. The forward facing edge of the body 72 defines rectilinear notch 73 to allow the body 72 to be positioned lower and nearer to hitch tongue 40 without being interfered with by forward angulated portion 40a of the hitch tongue 40. The rearward portion of planar body 72 defines laterally medially positioned rearwardly extending fastening protuberance 74 which extend rearwardly to a horizontal position substantially vertically above ball fastening hole 41 defined in hitch tongue 40 and a vertical position immediately above the forward spherical portion 47a sock beam 47. In the instance illustrated the rearward portion 74a of the fastening protuberance 74 preferably has a downwardly and rearwardly sloping upper surface 74a. The fastening protuberance 74 prevents upward motion of socket beam 47 away from ball 42 without interfering with socket beam fastening structure 49,50,52 or preventing horizontal turning motion of the socket beam 47 relative to ball 42.

Having described my invention its use may be understood.

A safety fastener is created according to the foregoing specification and drawings for use on a vehicle hitch structure 30 having a ball and socket hitch 31 as described. Vertical fastening post collars 32 are structurally joined by welding in opposed laterally aligned positions on the spacedly adjacent lateral sides of the forward part of rearward horizontal portion 40b of the hitch tongue, spacedly forwardly of fastening ball hole 41 in such position that when the safety fastener is assembled the fastening protuberance 74 of horizontal fastening beam 34 is extended rearwardly at least above the forward spherical portion 47a of "U" shaped socket beam 47 of the associated ball and socket hitch 31.

The vertical fastening posts 33 are then established in medial channels 59 of vertical fastening post collars 32 and are vertically positioned so that horizontal fastening beam 34 is immediately above the upper surface of the forward spherical portion 47a of "U" shaped socket beam 47. When the vertical fastening posts 33 are in this position a fastening pin 35 or 35a is inserted through an opposed pair of fastening pin holes 60 defined in vertical fastening post collars 32 and the axially aligned fastening slots 71 defined in vertical fastening posts 33 to fasten the horizontal fastening beam 34 as near as possible to the desired fastening position. Fastening pins 35,35a are then fastened for positional maintenance in the vertical fastening posts 33 as hereinbefore specified and the safety fastener is installed for use.

When using the safety fastener as described, it is to be noted that horizontal fastening beam 34 will be immediately above the socket beam of ball and socket hitch 31 and that the horizontal fastening beam 34 can not move upwardly by reason of its ultimate support on hitch tongue 40 which carries ball 42 of the ball and socket hitch 31. The socket beam 47 may not move upwardly to become disengaged from the ball 42 without breakage of either the ball and hitch structure or the safety fastener structure.

The foregoing description of my invention is necessarily of a detailed nature so that a specific embodiment of it may be set forth as required, but it is to be understood that various modifications of detail, rearrangement and multiplication of parts may be resorted to without departing from its spirit, essence or scope.

Having thus described my invention, what I desire to protect by Letters Patent and

What I claim is:

1. A safety fastener for a ball and socket hitch having a ball carried on a tongue of a vehicle hitch structure and a socket beam with a forward hemispherical portion pivotally and removably carried over the ball and operatively interconnected to a towed vehicles, comprising in combination:

similar paired opposed vertical fastening post collars defining a medial channel therethrough carried in laterally spaced positions on each side of the hitch tongue spacedly forwardly of the ball, each vertical fastening arm collar defining a plurality of vertically spaced fastening pin holes extending diametrically therethrough;

similar vertical fastening posts slidably carried in the medial channel of each vertical fastening collars with at least one of said vertical fastening posts defining a plurality of axially spaced fastening pin slots extending therethrough to cooperate with the fastening pin holes defined in the vertical fastening pin collars to receive at least one fastening pin therethrough to positionally maintain the at least one fastening post in vertical position relative to the associated fastening post collar;

a horizontal fastening beam extending between and carried by upper end portions of the paired opposed vertical fastening posts, said horizontal fastening beam having a fastening protuberance extending rearwardly over a portion of the socket beam carried by the ball of the ball and socket hitch; and at least one fastening pin extending through the at least one vertical fastening post collar and vertical fastening post carried therein to positionally maintain the vertical fastening post in the vertical fastening post collar, said fastening pin having releasable means for positional maintenance in the at least one vertical fastening post collar carrying it.

2. The safety fastener of claim 1 wherein the forward portion of the horizontal fastener beam defines an indentation to receive the forwarded angulated portion of the hitch tongue carrying the safety fastener to allow lower positioning of the horizontal fastening beam relative to the hitch tongue.

3. The safety fastener of claim 1 wherein the fastening pin has an elongate body defining a head at a first end and carries means for locking at a second end to require the use of a key to remove the fastening pin from engagement within an opposed pair of fastening pin holes of the associated vertical fastening collar to prevent unauthorized removal of the socket from the ball of a hitch.

* * * * *